Dec. 17, 1929.   G. A. HAIGHT   1,739,792

PISTON

Filed May 5, 1928

Patented Dec. 17, 1929

1,739,792

UNITED STATES PATENT OFFICE

GALEN A. HAIGHT, OF DETROIT, MICHIGAN

PISTON

Application filed May 5, 1928. Serial No. 275,305.

My invention relates to a new and useful improvement in a piston adapted for reciprocal movement in a cylinder and has for its object the provision of a piston so constructed and arranged as to compensate for the wear of the guiding portion of the piston while in use.

Another object of the invention is the provision of a piston having a movable guiding portion and provided with means for automatically adjusting the same upon the wear of the engaging surface thereof.

Another object of the invention is the provision in a piston of this class of a movable guiding portion and a stirrup for engaging the inner surface thereof and operated by yieldable means for adjusting the movable portion in accordance with the wear effected on its engaging surface.

Another object of the invention is the provision of an automatically adjustable piston which will be simple in structure, economcal of manufacture, easily and quickly assembled and durable and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention.

Fig. 2 is a side elevational view of the invention taken from a side different than the side from which Fig. 1 is taken.

Fig. 3 is a sectional view taken on line 3—3 of Fig. 1.

Fig. 4 is a sectional view taken on line 4—4 of Fig. 3.

Fig. 5 is a fragmentary sectional view taken on line 5—5 of Fig. 3.

The invention comprises a head or groove bearing portion 9 provided with the grooves 10 in which the piston rings engage. The skirt is provided at one side with a substantially elliptical opening 11. A plate 12 is adapted for closing said opening and is loosely positioned therein. Parallel reinforcing ribs 13 and 14 are formed on the inner surface of the plate 12 and a transversely extending reinforcing rib 15 is formed centrally on the inner surface of the plate 12. Projecting inwardly from the inner surface of the plate 12 is a tapered boss 16. Formed in the skirt opposite the opening 11 is an opening 17 closed by a suitable plate 18 pressed therein. Projecting inwardly from the plate 18 is a screw 19, this screw being in fixed relation to the plate 18. Embracing the screw 19 is a helical spring 20, one end 21 of which is projected through the plate 18 and secured therein. The other end 22 is projected through a flange 23 formed on the tapered nut 24, the end 22 being secured in the flange 23. The nut 24 is adapted for threading on the screw 19 and as this nut is threaded on the screw, the spring 20 is wound, so that the spring 20 has a tendency to unthread the nut 24 therefrom.

Formed on the inner surface of the head 9 is a rib 25 having a recess 26 formed therein for engaging a rib on the stirrup 28. This stirrup is formed of two pieces of metal, one of which has the outwardly projecting flanges 29 and 30, and the other of which has the doubled over flanges 31 and 32, the flange 30 and the flange 32 forming the rib referred to. The ends 33 and 34 of the stirrup are angularly turned and open. Engaging in each of these ends is a collar 35 having a flange 36 for engaging the ends of the stirrup. As shown in Fig. 3 one end of the stirrup is centered about the boss 16 and the other end is centered about the tapered nut 24, the engagement of the rib in the recess 26 being a loose one so that radial movement of the stirrup 28 may be effected by pressure exerted thereon by the nut 24.

The spring 22 tending to unthread the nut 24 will force the stirrup to move radially until the plate 12 is engaged by a resisting surface so that this radial pressure exerted by the nut 24 will always retain the plate 12 in engagement with the cylinder walls so that as the outer surface of the plate 12 wears or as the surface of the cylinder wears, an unthreading of the nut 24 will be effected to press the plate outwardly and maintain a tight engagement. In this manner a firm guiding of the piston is provided at all times, with the consequent elimination of the piston slap, scoring and other defects resulting from improper guiding action by the piston skirt.

The stirrup, as shown in Fig. 5, is reinforced by a diametrically extending plate 72.

While I have illustrated and described the preferred form of my invention, I do not wish to limit myself to the precise details of structure shown, but desire to avail myself of such variations and modifications as come within the scope of the appended claims.

Having thus described my invention, what I claim as new and desire to secure by Letters Patent is:

1. A piston of the class described, comprising: a guiding portion having an opening formed therein; a closure for said opening loosely positioned therein; an engagement member engaging the inner surface of said closure; a pressing member for pressing against said engagement member and tending to force said closure outwardly of said piston; and resilient means for adjusting the position of said engagement member.

2. A piston of the class described having a guiding portion provided with an opening formed therein; a closure for said opening loosely positioned therein; an engagement member engaging the inner surface of said closure; means engaging one end of said engagement member; threaded means for supporting said means; and resilient means for moving said engaging means axially of said threaded means in accordance with the wear on the outer surface of said closure.

3. A piston of the class described, comprising: a skirt having an opening formed therein; a closure for said opening loosely positioned therein; a boss projecting inwardly of said closure; a stirrup loosely positioned in said piston and having its ends angularly turned to extend radially thereof, one of said ends engaging said boss; a threaded member projecting inwardly of said piston diametrically opposite said boss; a nut threaded on said threaded member and engaging the opposite end of said stirrup; and a spring for threading on said nut on said threaded member and effecting outward pressure on said closure determined by the inward pressure exerted on said closure.

4. A piston of the class described, comprising: a skirt having an opening formed therein; a closure for said opening loosely positioned therein; a boss projecting inwardly of said closure; a stirrup loosely positioned in said piston and having its ends angularly turned to extend radially thereof, one of said ends engaging said boss; a threaded member projecting inwardly of said piston diametrically opposite said boss; a nut threaded on said threaded member and engaging the opposite end of said stirrup; a spring for threading on said nut on said threaded member and effecting outward pressure on said closure determined by the inward pressure exerted on said closure; a head on said piston; and means on the inner surface of said head engaging said stirrup for guiding the same in its movements.

In testimony whereof I have signed the foregoing specification.

GALEN A. HAIGHT.